United States Patent [19]

Ueda

[11] 4,343,990
[45] Aug. 10, 1982

[54] HEATING APPARATUS SAFETY DEVICE USING VOICE SYNTHESIZER

[75] Inventor: Shigeki Ueda, Nara, Japan

[73] Assignee: Matsushita Electric Industrial Co. Ltd., Osaka, Japan

[21] Appl. No.: 197,204

[22] Filed: Oct. 15, 1980

[30] Foreign Application Priority Data

| Oct. 18, 1979 | [JP] | Japan | 54-134943 |
| Oct. 18, 1979 | [JP] | Japan | 54-134944 |
| Oct. 18, 1979 | [JP] | Japan | 54-134945 |
| Oct. 18, 1979 | [JP] | Japan | 54-134946 |

[51] Int. Cl.³ .............................................. H05B 9/06
[52] U.S. Cl. .................................... 219/492; 219/506; 219/10.55 B; 340/692; 340/384 E
[58] Field of Search ............... 219/490, 492, 494, 501, 219/497, 506, 508, 10.55 B, 10.55 M; 307/117; 340/692, 602, 569, 540, 500, 384 E

[56] References Cited

U.S. PATENT DOCUMENTS

| 4,031,352 | 6/1977 | Oosterberg | 219/212 |
| 4,158,432 | 6/1979 | Van Bavel | 219/10.55 B |
| 4,158,759 | 6/1979 | Mason | 219/506 |
| 4,162,381 | 7/1979 | Buck | 219/10.55 M |

FOREIGN PATENT DOCUMENTS

| 54-2098 | 9/1979 | Japan | 219/10.55 B |
| 55-38449 | 3/1980 | Japan | 219/10.55 B |

Primary Examiner—B. A. Reynolds
Assistant Examiner—M. H. Paschall
Attorney, Agent, or Firm—Spencer & Kaye

[57] ABSTRACT

A heating apparatus with a simplified operating panel comprising a multi-command key actively incorporating several similar functions and a voice synthesizer section such as a PARCOR synthesizer is disclosed. The accepted function of the multi-command key or the next operating step is announced by a synthetic voice. A program recall function is provided to confirm each stage of a preset programmed heating at given timing. The heating progress condition detected by a sensor and a timer is announced by a synthetic voice. Any loss of the functions of the sensor or the timer is detected immediately, followed by the stoppage of heating and the alarm and announcement of the fault.

5 Claims, 17 Drawing Figures

FIG. 5a
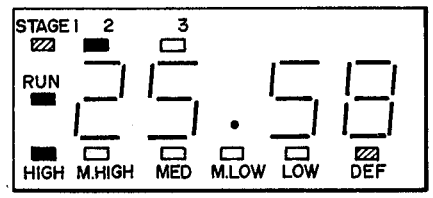
FIG. 5b
 PROGRAM RECALL
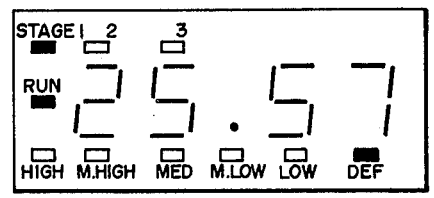
"STAGE ONE DEFROST 26MIN"
FIG. 5c
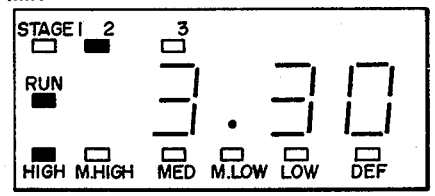
"STAGE TWO HIGH 3MIN.30sec"
FIG. 5d
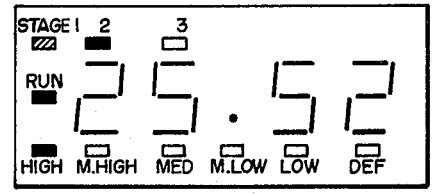

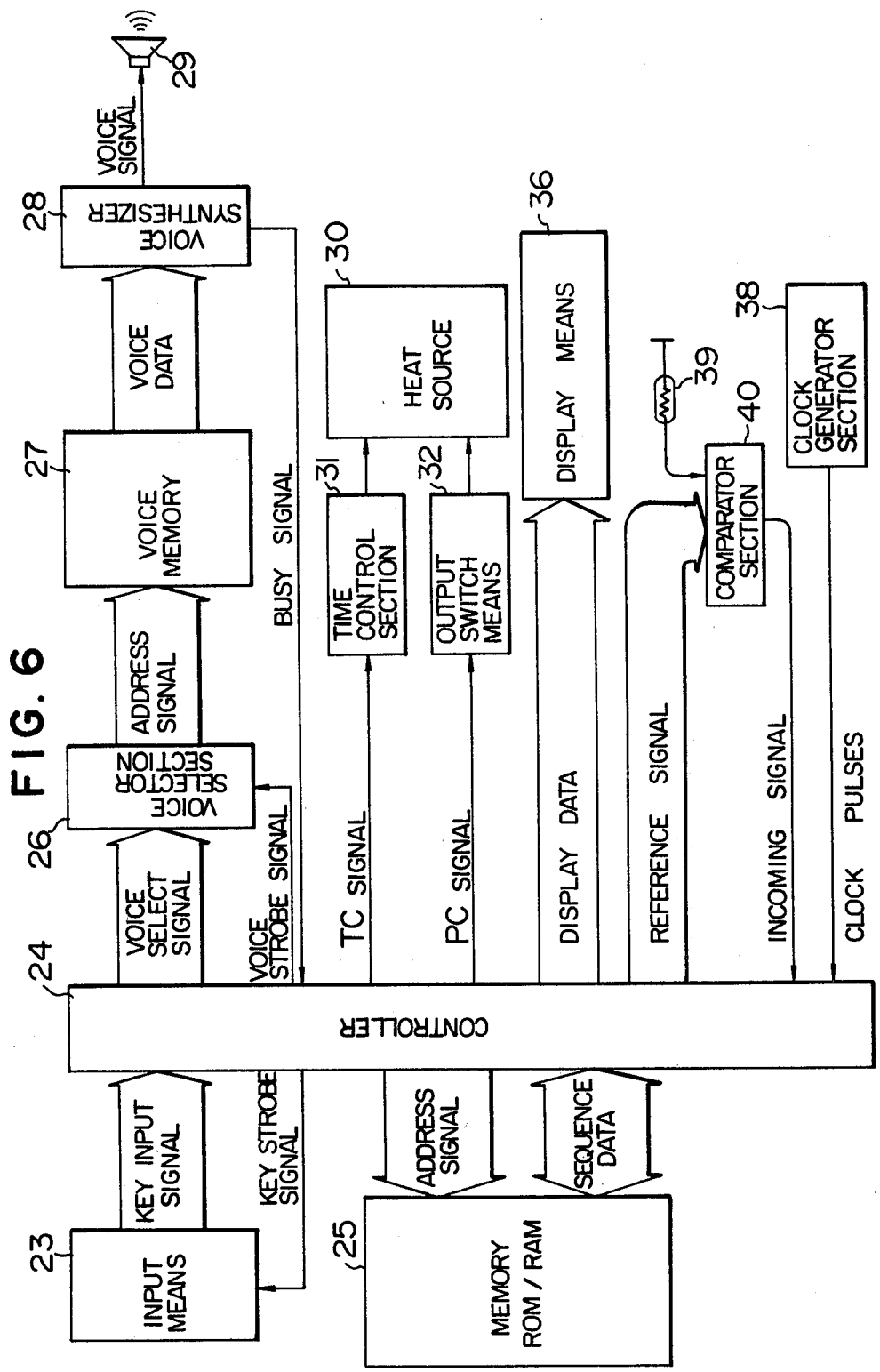

HEATING APPARATUS SAFETY DEVICE USING VOICE SYNTHESIZER

BACKGROUND OF THE INVENTION

The remarkable progress of the semiconductor technology has brought about numerous technological revolutions in the field of home appliances. High-performance home appliances which involve systems which were too large to be commercialized by the prior art discrete circuit configurations have recently been successfully supplied to the market due to the reduced cost of the microcomputers, LSI, large-capacity memories and the like.

High-performance products with a high added value, however, generally include an operating section with a number of operating keys complicating the handling procedures, resulting in an increased risk of erroneous operation of the system due to users' operating errors. This is especially true because heating apparatuses are mainly used by ordinary housewives who, unlike audio set enthusiasts, are not interested in multi-function equipment which is complicated to operate. Further, misuse of a heating apparatus often causes a heating failure of the food to be cooked and in an extreme case may lead to an accident such as a fire in and outside of the heating chamber.

In addition, a system comprised of electronic circuits is liable to be operated erroneously by spurious noise signals. Factors causing malfunctions of an electronic device are varied and include spike noises from the power line, radiation noise coming directly into the system, and static electricity. The most adverse malfunction of the heating apparatus which is caused by such physical factors are those concerning control of the heating means. It actually sometimes happens that an undesired heating process is started or heating still continues after the lapse of a predetermined heating time. These malfunctions, like the above-mentioned malfunctions due to personal factors, are particularly dangerous because they may result in loss of human life or property by causing a fire.

Therefore, the most important requirement in system safety design for heating apparatus including electronic circuits is to prevent the two great personal and physical errors of misuse and malfunctions, and to quickly inform the user of any case of such misuse or malfunctions.

The object of the present invention is to provide a safety device using a voice synthesizer for the heating apparatus for preventing the two errors of misuse and malfunctions and informing the user quickly of any case of such troubles.

SUMMARY OF THE INVENTION

As a means of achieving this object, a voice synthesizing technique is used, and by making use of the features mentioned below of the human voice (language), the above-mentioned object is realized without fail. Of all the features of the voice (language), three are utilized by the present invention. First, information is transmitted even to a user who is distant from the apparatus. Secondly, the information is transmitted directly. Thirdly, the information transmitted is understandable even by illiterate persons or infants. These three features work very effectively to prevent such emergency cases as misuse and malfunctions.

BRIEF DESCRIPTION OF THE DRAWINGS

The above and other objects, features and advantages will be made apparent by the detailed description taken in conjunction with the accompanying drawings, in which:

FIGS. 5a to 5d show an example of a program recall;

FIG. 6 is a block diagram showing a configuration of the present invention;

DESCRIPTION OF THE PREFERRED EMBODIMENTS

The configuration of the present invention for attaining the above-mentioned object is generally divided into four items which include a simple operating panel which is unlikely to be misused, a program recall function to make sure that there is no error in the course of programming a set stage heating, a function to report the heating progress detected by a sensor means or a timer means at the time heating is started, and means for detecting a fault in the sensor means or timer means, taking a predetermined trouble-shooting action and giving an alarm when an error occurs.

These items will be described in detail one by one. First, the simple construction of the operating panel will be explained. Several keys having comparatively similar functions on the operating panel are grouped positively into a single multi-command key. By doing so, the operating panel configuration is simplified. The multi-command key performs different functions each time it is depressed according to the conditions prevailing at the time it is actuated, and therefore the operating convenience is not much improved. In order to improve the operating convenience, therefore, the conditions are identified by the system and the user is informed of a selected function or the next operating step through a synthesized voice, thus realizing an apparatus with a simple and conveniently-operated operating panel. Explanation will now be made with reference to the accompanying drawings.

Figure 1:
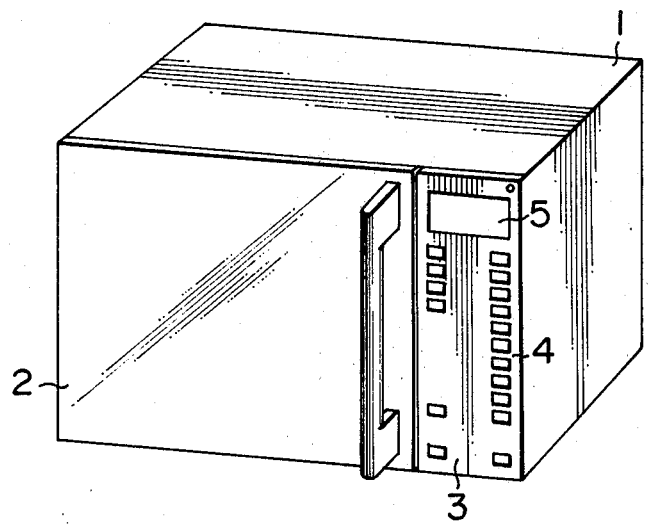
FIG. 1 is a perspective view showing the body of a conventional heating apparatus.
Figure 2:
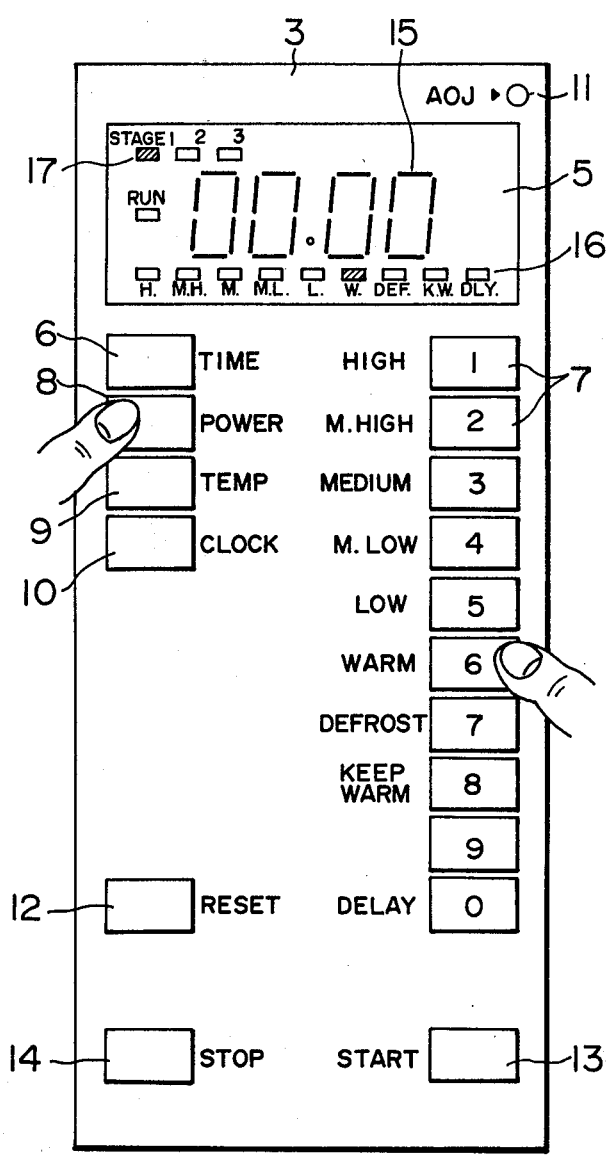
FIG. 2 is a diagram showing in detail a conventional operating panel.

Conventional heating apparatuses such as a microwave oven or electric range having a digital control section generally include an operating panel configuration as shown in FIGS. 1 and 2. FIG. 1 is a perspective view of the body of a heating apparatus having such an operating panel and FIG. 2 is a diagram showing in detail the operating panel. In these drawings, a door 2 free to open and close and an operating panel 3 are provided on the front of the body 1. A keyboard 4 and a display section 5 are arranged on the operating panel 3. Various commands or instructions of the user are applied to a control system through the keyboard 4. In this way, the conventional operating panel includes more keys with the increase in functions, and these keys must be operated in a predetermined order for effective data input. A wrong key is often depressed or keys are depressed in a wrong order resulting in an erroneous setting.

For example, the two-stage heating using a timer, through very useful for heating the food successfully, involves complicated program steps which are difficult to understand, often causing a cooking failure by the user. This two-stage heating by a timer will be described below.

Figure 3A:
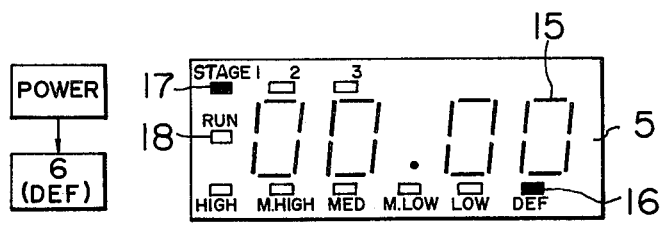
FIGS. 3a to 3e show operating steps and displays for programmed heating.

Key operations and displays are shown in FIGS. 3a to 3e. The time is ordinarily indicated on the display section 5. The timer mode is changed by depressing the power key 8, so that "00.00" appears on the numeral display section 15, and "STAGE 1" of the stage indicator 17 is lit. Depression of the power level key 7 (DEF), the output "DEFROST" is preset, and the DEF status of the power indicator 16 is lit. (FIG. 3a)

Figure 3B:
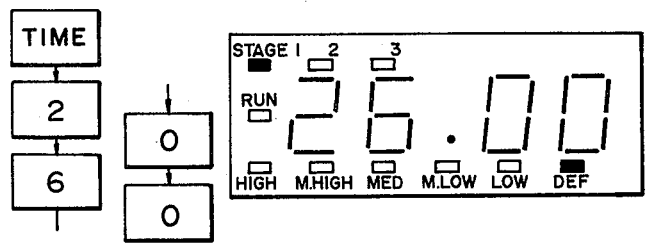

Upon depression of the time key 6 and the numeral keys 7, a heating time is preset. If the key TIME and "2", "6", "0" and "0" of the numeral keys 7 are depressed in that order, for instance, the time of 26 minutes is entered and "26.00" appears on the numeral display section 15. (FIG. 3b)

Figure 3C:
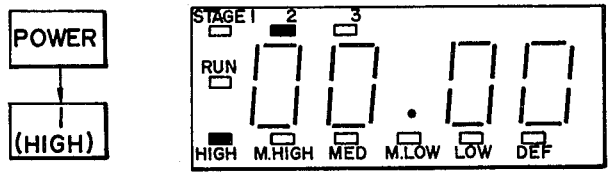

Upon subsequent depression of the POWER key and the power level key "1(HIGH)", it is accepted as an output for the second stage. The numeral display section 15 returns to "00.00" and STAGE 2 of the power indicator 16 and the HIGH status of the power indicator 16 are lit (FIG. 3c).

Figure 3D:
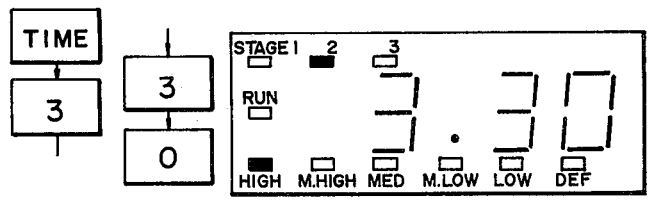
Figure 3E:
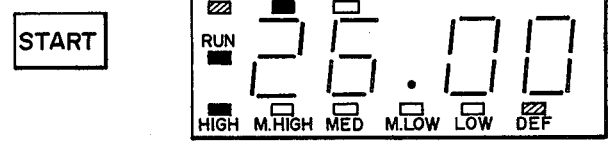

As in the first stage, the TIME key and the numeral keys "3", "3" and "0" are depressed to store the heating time of 3 minutes and 30 seconds, so that "3.30" appears on the numeral display section 15 (FIG. 3d).

It will be seen that in the stage heating, a number of keys must be operated, data are displayed on different display sections successively, and also the keys must be operated in accordance with a predetermined rule, thus complicating the operation of the apparatus.

After presetting the data for a two-stage programmed heating, the heating is started by depression of the START key 13. The first input "DEFROST 26 min." is executed, followed by the execution of the "HIGH: 3 min 30 sec" of the second stage. At this time, the display section 5 may flicker the "STAGE 1" and "DEF" in execution while continuously lighting the remaining heating stage, so that the stage indicator 17 and the power indicator 16 may display the whole of the preset program, but the numeral display section 15 can display only the heating time of the stage in execution. (FIG. 3e) In other words, it is impossible to confirm the heating time of the second stage while the first stage is being executed.

The same can be said of the programs of FIGS. 3a to 3d. Once the mode of FIG. 3c is entered, the data of the preset first stage cannot be identified. This problem becomes more serious when the number of stages is increased from a 2 stage sequence of heating, as in the embodiment under consideration, to 3 or 4 stages. Because of this irrevocability, the programming of the stage heating must be planned very carefully and there is no allowance for error.

As mentioned above, in the stage heating useful for the heating apparatus, the user is liable to commit an error in setting. If the cooking is started with an erroneous setting, it naturally fails and in an extreme case the food to be cooked may start a fire following carbonization. This is a second problem to be solved.

Figure 4:
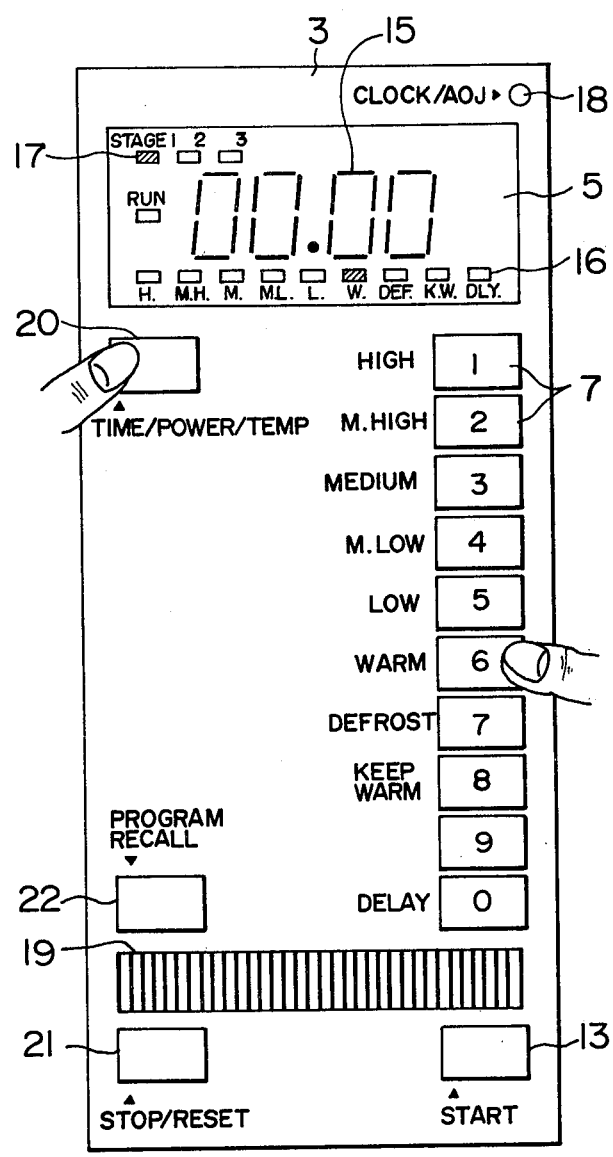
FIG. 4 is a diagram showing in detail an operating panel according to an embodiment of the present invention.

The operating panel according to an embodiment of the present invention is shown in detail in FIG. 4. This operating panel solves the above-mentioned two great problems by a simple operating panel which hardly causes error or misuse and a program recall function capable of checking an error in a set heating program. The construction of the operating panel according to the present invention will be described below with reference to the drawings. A display section 5, numeral keys 7 doubling as an output level setting control, and a START key 13 completely identical to those included in a conventional apparatus are provided. These keys have the same functions as the counterparts of the conventional apparatus, so that the display section 5 has the same display functions as the conventional apparatus.

On the other hand, the CLOCK/ADJUST key 18 combines the functions of the conventional CLOCK key 10 and the ADJUST key 11. When this key is depressed for time indication, the system enters an adjust mode, and the selected mode name is issued to the user through the speaker slit 19 in the form of a synthesized voice "ADJUST".

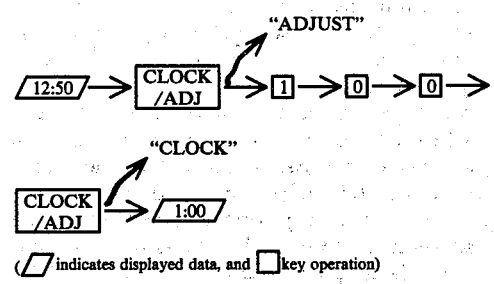

(□ indicates displayed data, and □ key operation)

The time is set in the same steps as in the conventional apparatus. After the time is set, the second CLOCK/ADJUST key synthesizes the voice "CLOCK" meaning that the setting is completed and the clocking operation starts. In place of "ADJUST", the next operating step may be notified. Specifically, "SELECT TIME" may be issued and thus the user is required to set the time by the numeral keys 7.

If the CLOCK/ADJUST key is depressed for other than time indication, the clock mode is entered and the time is indicated. With the release of this mode, the indication is restored.

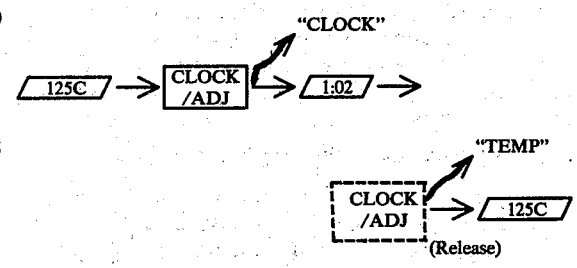

At the time of release, the previous mode name such as "TEMP" is issued.

As seen from above, the CLOCK/ADJUST key 18 is a multi-command key having dual functions corresponding to the functions of the prior art CLOCK key 10 and the ADJUST key 11. Individual functions selected are notified orally to the user directly, thus greatly reducing the risk of misuse of the apparatus.

Next, the function key 20 will be described. This key has three combined functions corresponding to those of the conventional TIME key 6, the POWER key 8 and the TEMP key 9, any of which can be selected by tapping. Specifically, one tap selects the TIME function, two taps the POWER function, and three taps the TEMP function. An example of setting the output and the heating time by this function key will be shown below.

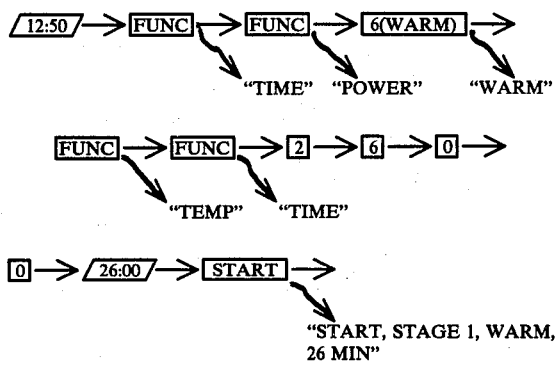

The function thus selected is orally announced in the words "TIME", "POWER" or "TEMP". Thus the function key 20, despite being a multi-command key having triple functions, is not complex to operate. Rather, it has three functions of similar keys combined into one, so that the operating panel 3 is simplified and does not present a crowded appearance to the user. Further, when a numeral key 7 is used as an output level key, the output level is orally announced in such specific words as "warm", thereby facilitating the operation of the numeral keys 7 making up multi-command keys. Upon depression of the start key 13, a heating pattern such as "START, STAGE 1, WARM, 26 MIN" is again orally announced asking a renewed check of any programming error.

The temperature is set by the numeral keys 7 after selection of the TEMP mode by the function key 20 as in the conventional way.

The STOP/RESET key 21 is also a multi-command key having the program clear function of the conventional RESET key 12 and the heating suspension function of the STOP key 14 at the same time. If this key is depressed during programming, the programmed data are cleared with the announcement of "RESET" and a time indication is restored. If the key 21 is depressed during heating, on the other hand, the heating is suspended temporarily with the announcement of "STOP".

Now assume that a two-stage sequence heating of "DEFROST, 26 MIN, HIGH, 3 MIN 30 SEC" is programmed and the heating is started according to the above-mentioned steps. The data indicated in the display section 5 at this time are as shown in FIG. 5a. Specifically, STAGE 1 is flickered indicating the execution; STAGE 2 is continuously lit indicating a two-stage sequence heating; RUN is lit indicating the heating; DEF flickers indicating an execution output; HIGH is lit indicating the power of the second stage programmed; and 25 MIN 58 SEC is lit indicating the residual heating time of the first stage. This residual heating time is decremented every second.

If the PROGRAM RECALL key 22 is depressed again to recheck the data on the programmed sequence heating, the indication in the display section 5 changes to that of FIG. 5b indicating the residual heating time and power of the first stage. At the same time, a synthesized voice "STAGE 1, DEFROST, 26 MIN" is announced from the slits 19. As a result, the heating pattern of the first stage, together with the setting and the residual time are communicated simultaneously both visually and orally without fail.

When a key is depressed, the eye line of the user is generally directed toward the particular key and therefore the display section 5 cannot be viewed at the same time. This shortcoming is effectively overcome by aural communication through a synthesized voice.

The announcement of the first stage is automatically followed by the announcement of the second stage. (FIG. 5c) Specifically, the power and heating time of the second stage are displayed simultaneously, while at the same time synthesizing and announcing the words "STAGE 2, HIGH, 3 MIN 30 SEC".

If the third stage is incorporated, the heating pattern of the third stage is announced following FIG. 5c. In this way, a series of heating processes are called successively by the PROGRAM RECALL key 22. Upon completion of the series of recall announcements, the indication returns to FIG. 5d, thus restoring the total indication of the status and the residual heating time of the first stage.

As an alternative, the program recall key may be so constructed as to recall one stage by one tap and restore the original indication on release. As another alternative, each stage may be recalled as in the previous case and the key released to stop with the particular stage indicated. These modifications make possible correction beyond a stage. Unlike this embodiment in which program is recalled during heating, the recall is of course possible during programming. Also, the voice announcement may be limited to the stage number, and the data for each stage may be checked by the display section.

Figure 7:
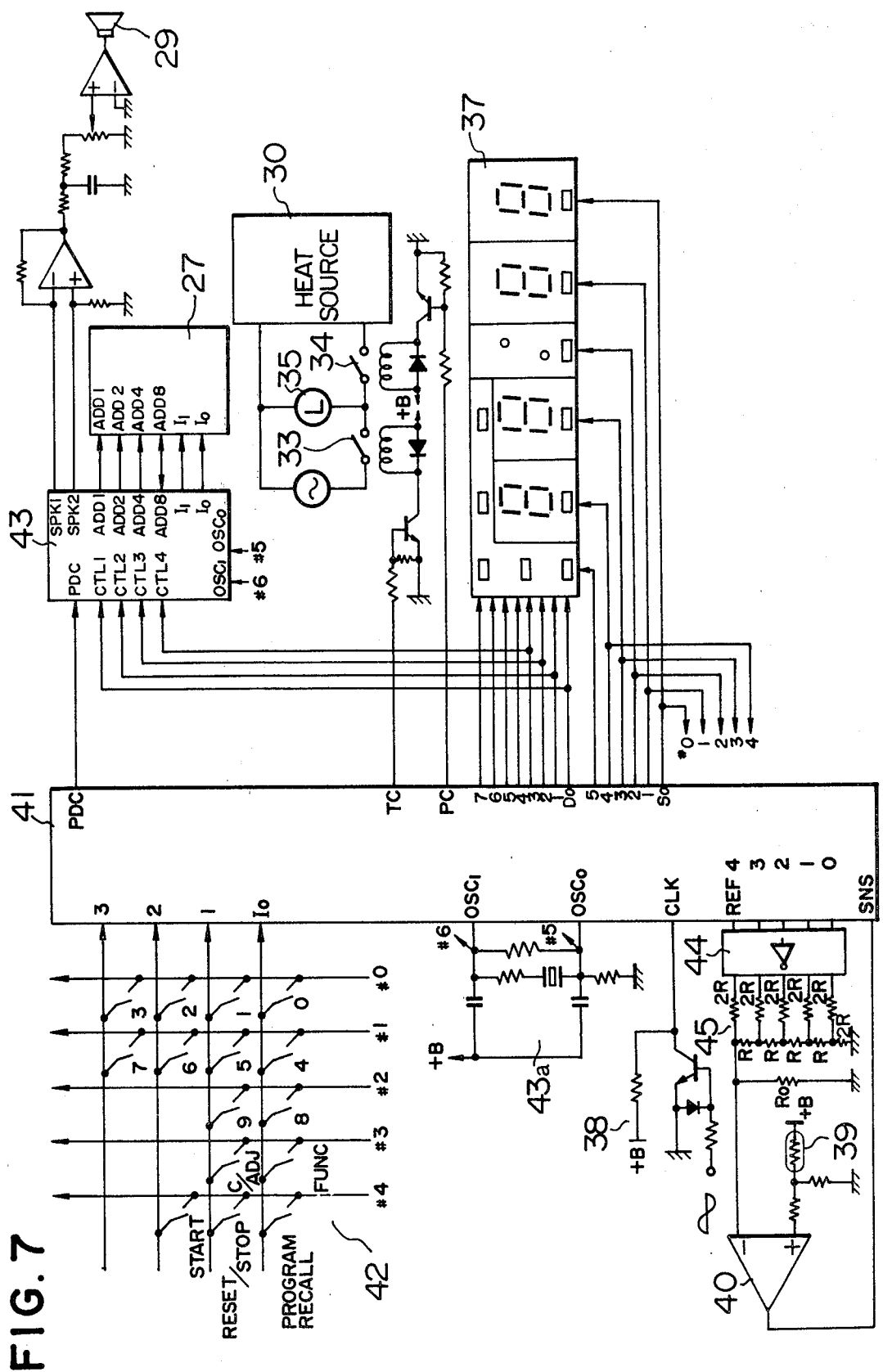
FIG. 7 is a diagram showing a circuit embodying the present invention.

A circuit configuration for realizing the present invention will be described below. A block diagram of the present invention and an example of a specific circuit configuration thereof are shown in FIGS. 6 and 7 respectively.

Explanation will be made of the relation between the configuration of the operating panel and the control system with reference to FIGS. 6 and 7. At the same time, the heating progress announcement function and the error announcement function making up the third and fourth features of the present invention respectively will also be described.

The input signal taken into the controller 24 in synchronism with a strobe signal thereof by way of input means 23 such as the keyboard 4 is decoded by the controller 24 and accepted as an input command, and stored in the RAM of the memory 25. Then the controller 24 produces a predetermined control signal thereby controlling the output. In order to orally announce the function representing the operation executed, the controller 24 couples a predetermined voice select signal to the address selector section 26. In response to this signal, the address selector section 26 applies an address signal to the voice memory 27, so that the voice data is read out of the voice memory and synthesized by the voice synthesizer section 28 to produce a voice signal, which emanates from speaker 29.

An example of the operation of the system in response to the depression of the STOP/RESET key 21 will be described with reference to this block diagram. When a STOP/RESET command is applied to the controller 24 by way of the keyboard 4, the controller 24 first checks the present operation mode of the system. If the heating mode is involved, a control signal which stops the supply of power to the heating source 30 is produced in order to execute the stop function. In other words, a TC signal to turn off the time control section 31 is produced. At the same time, the address selector section 26 is impressed with a voice select signal indicating a memory area storing voice data for the word "STOP". In response to this signal, the address selector section 26 produces a predetermined address signal and sequentially updates the same. As a result, the voide data "STOP" is produced sequentially from the memory and applied to the voice synthesizer section 28 so that a voice signal is synthesized to energize the speaker 29. Thus, a synthesized human voice speaking the word "STOP" is heard upon suspension of heating.

If the controller 24 decides that the program mode is involved, on the other hand, the controller 24 erases the program data preset in the controller in order to execute the clear function. At the same time, the address selector section 26 is supplied with a voice select signal to select the voice data for the word "RESET". Thus the program data are cancelled while at the same time the spoken word "RESET" is heard.

This mode decision is made by the controller 24 checking the RAM of the memory 25. Generally, during the period when a voice is being synthesized, namely, during the period when a busy signal is applied to the controller 24 from the voice synthesizer section 28, the next entry of a key command is prohibited. If a new key command is entered during the reporting of an accepted key function, the intention of the invention which is to form a panel simple to operate is not realized, so that the function of reporting the system mode to the user is lost, thus making it difficult to understand the next process of operation. The STOP/RESET function is the only exception which is given top priority in acceptance even during voice synthesization. This is because of the emergency nature of the stop function which is probably used when it is desired to stop the heating process if, for example, a fire has started in the heating chamber. The user may desire to suspend or end the heating halfway in the case of a lesser emergency such as when the user, checking each stage by way of the program recall key 22, realizes that there has been a program error. In such a case, it is necessary to stop the heating as soon as possible. Even if the synthesized voice is still reporting the first stage, therefore, the STOP/RESET key 21 is accepted and processed appropriately. The recall voice reporting is cancelled.

The heat source 30 is a magnetron for the microwave oven and a heater for the electric range. The heat source 30 is controlled by the time control section 31 and the output switch means 32 to execute a predetermined output and a heating time. These operations are actually realized by the time relay 33 and the output switch relay 34 and controlled by a time control signal TC and a power control signal PC. The relays may be replaced by semiconductor switches such as triacs, and the output switching may be performed by interrupting the power supply or phase control. Numeral 35 shows an auxiliary load such as an oven lamp. The controller 24 produces the TC and PC signals, so that display data are applied to the display means 36 thereby to providing a predetermined display. The display means 36 may comprise a 6-grid phosphorescent display tube 37 operated by 8-bit data signals $D_0$ to $D_7$ and scan signals $S_0$ to $S_5$ for sweeping and dynamically lighting the grids.

In order to make up the third feature of the present invention, a clock pulse from the clock signal generator section 38 and a detection signal from a sensor 29 which detects the gas, infrared rays, temperature or humidity of the object being cooked, is impressed on the controller 24 as a means of judging the heating progress. The clock pulse provides reference data for controlling the time control means 31 to count the lapse of the heating time. The form of sensor 39 already in practical use includes a temperature probe (contact type) with a thermistor encased in the forward end of a metal bar tube, a humidity sensor for detecting the humidity from the object, an infrared ray sensor responsive to infrared rays or a gas sensor for detecting a gas. The sensors other than the temperature probe are of the contactless type. All of the above-mentioned sensors detect physical and chemical changes of the object, and the resulting data are used to estimate the progress of heating. In the embodiment under consideration, a reference signal is produced from the controller 24 and compared with the signal from the sensor 39 at a comparator section 40 for such detection.

On the basis of the data supplied from the clock generator section 38 and the sensor 39, the controller 24 reports the detected heating condition. The reporting takes the form of a detected temperature, the lapse of heating time, residual heating time, a time point when a predetermined quantity of gas or humidity is detected or reaching of a stage switching time point. This reporting permits the user to know whether the heating is going smoothly or not without attending the heating apparatus. Even if a heating program error is committed and this is overlooked without using a program recall function or after using the same function, the user has an increased chance to learn of a setting error by the message which is automatically announced at intervals. This makes the most of the advantage of a voice directly and immediately reaching a distant person. Another feature of this heating condition announcement is that even if a malfunction of the system is caused by a noise and a set heating program is destroyed, "90° C." or "100° C." or like announcement instead of a preset "80° C." will inform the user of the abnormality. If the residual heating time is not announced after a considerable time, the fact that the system is not functioning normally can be inferred.

These heating condition announcements are of course useful even during normal operation of the system. For successful heating of the food, it is necessary to peep into the heating chamber occasionally to make sure that the food is not overheated. The heating progress announcements according to the present invention may be used as a measure of this heating-chamber checking. Then as compared with the conventional heating apparatuses which announce by buzzer only the end of the heating, the apparatus is much easier to use and is capable of cooking the food more successfully.

A specific circuit configuration will be described below. In FIG. 7, the controller 24 and the memory 25 are realized by a microcomputer 41 with a memory incorporated in one chip. This microcomputer 41 is supplied with a key input signal from a key matrix 42 corresponding to the input signal 23 through a key strobe signal. The digit scan signals $S_0$ to $S_4$ for lighting the display tube 37 dynamically are used as the key strobe signals and applied to the terminals $I_0$ to $I_3$ as a 4-bit key input signal.

Figure 8:
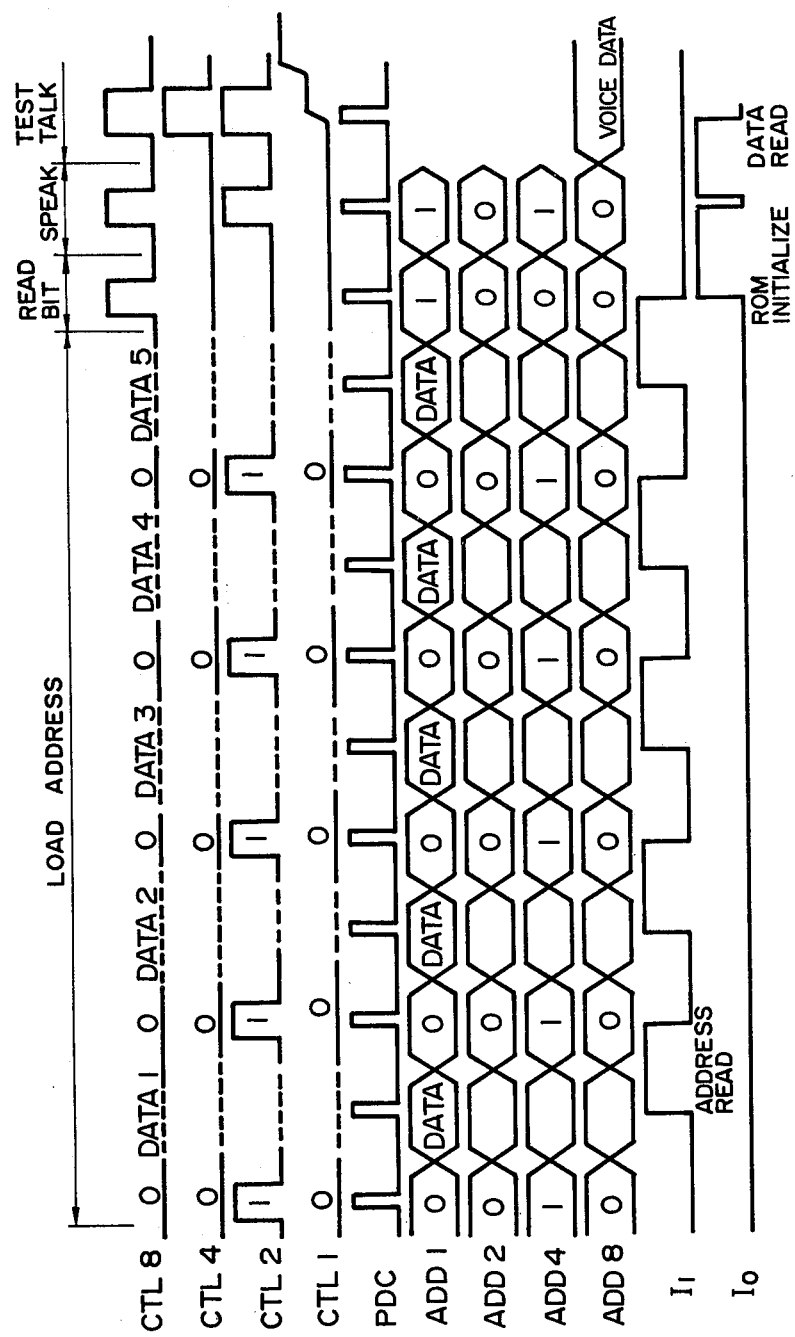
FIG. 8 is a timing chart for a synthesizer.

The voice synthesizer section specifically comprises a synthesizer LSI 43 utilizing voice synthesizing techniques such as the PARCOR synthesizing process and a voice memory for giving a parameter to the synthesizer 43. For simplification of the system, the segment signals $Seg_3$ to $Seg_0$ for display data are used as address data without any exclusive output port. Thus timing of the address data set is provided by time sharing of one scan, and after completion of the display, the address data are produced at $Seg_3$ to $Seg_0$ and applied to the input ports CTL1 to CTL8 of the synthesizer 43 by the PDC signal. FIG. 8 shows the timing for this operation in which the address data are preset in five parts. (LOAD ADDRESS)

The decoded address data are applied to the terminals ADD1 to ADD8 and loaded in the voice memory 27 by the $I_1$ signal.

After the address is loaded, the data begins to be read out by the $I_0$ signal. The data appears bit by bit at the ADD8 port and is read into the synthesizer 43. These data are a parameter for operating the synthesizer and extracted by analysis of the voice.

This parameter is processed in the synthesizer 43 and produced at SPK1 and SPK2 as a voice electrical signal. This is an output of a D/A converter, which is waveform shaped and amplified and then restored as a voice from the speaker 29.

In time counting or heating time control (timer control), the clock pulses are stopped so that further time counting or timer control is impossible if the clock line forming the basis of time counting fails. In timer control, such a failure causes the heating to continue endlessly, thus leading to burning of the object to be cooked. This is called a clock pulse error.

Sensor wire breakage or short circuiting is also a cause of heating failure. Especially, the wire breakage, like the above-mentioned timer stoppage, is a serious fault leading to the danger of a fire attributed to continued heating. This is called a sensor wire breakage error.

First, the method of detecting a clock pulse error will be described. The microcomputer 41 comprises another timer means for counting the number of scans of the display tube 37 in addition to the timer means for counting the clock pulses supplied from the clock pulse generator section 38. Such an additional timer means functions as long as the oscillator 43a of the microcomputer 41 operates. The output of this timer is stored in the RAM and is capable of counting for three seconds or other length of time based on the time required for one scan, say, about 10 msec. If a clock pulse is supplied during this time, this soft logic timer is cleared and therefore does not function. If a clock signal fails to be supplied, however, the soft logic timer continues to operate without being cleared, and after counting of three seconds, a carry occurs. This carry immediately stops the heating through the microcomputer, so that an alarm and a timer stop are announced orally. This informs the user that the heating has failed and the timer is out of order and cannot operate, thus allowing him to call a serviceman or take another appropriate measure. In this way, the foolish and dangerous act of proceeding with the heating with the timer broken is prevented.

Similar measures are taken in case of a fault of the sensor. The breakage of sensor wire is detected by the steps mentioned below. Reference voltages $REF_0$ to $REF_4$ are capable of producing 32 voltage levels. Numeral 44 shows a switching element such as a C-MOS inverter which, in cooperation with the ladder 45, converts a digital signal of 32 levels into an analog signal and applies it to the comparator 40. The ends of this reference voltage namely, X 00 and X IF are used as level which represent shorting and opening of the sensor, and a practical level is designed inwardly of this range, such as X 03 and X IC, thus enabling the shorted or open conditions of the sensor to be detected.

Figure 9:
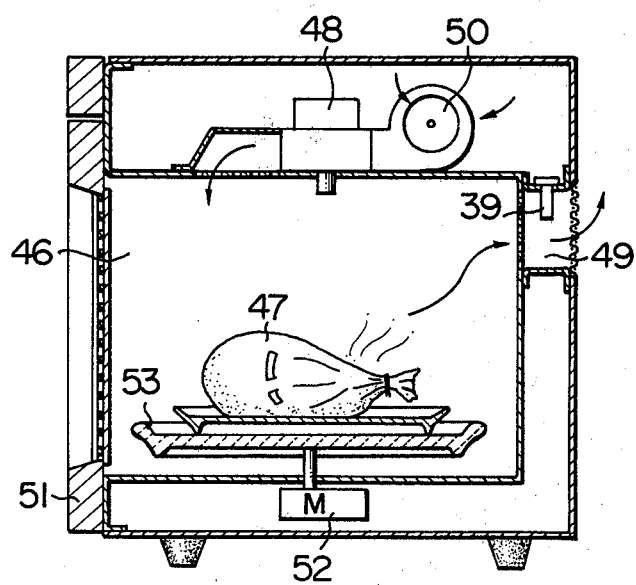
FIG. 9 is a sectional view of a heating apparatus.

A sectional view of the heating chamber is shown in FIG. 9. The object to be heated 47 is disposed in the heating chamber 46, and radiated with microwave by the magnetron 48. On the other hand, the sensor 39 is disposed within the air guide 49. The magnetron 48 is cooled by the cooling fan 50, and the heating chamber 46 is ventilated. The electrical resistance value greatly changes in response to the gas, temperature and relative humidity of the inner air flow. Numeral 51 shows a door, and numeral 52 shows a mount rotating motor for eliminating the heating variations of the object 47 by rotating the mount 53.

Figure 10:
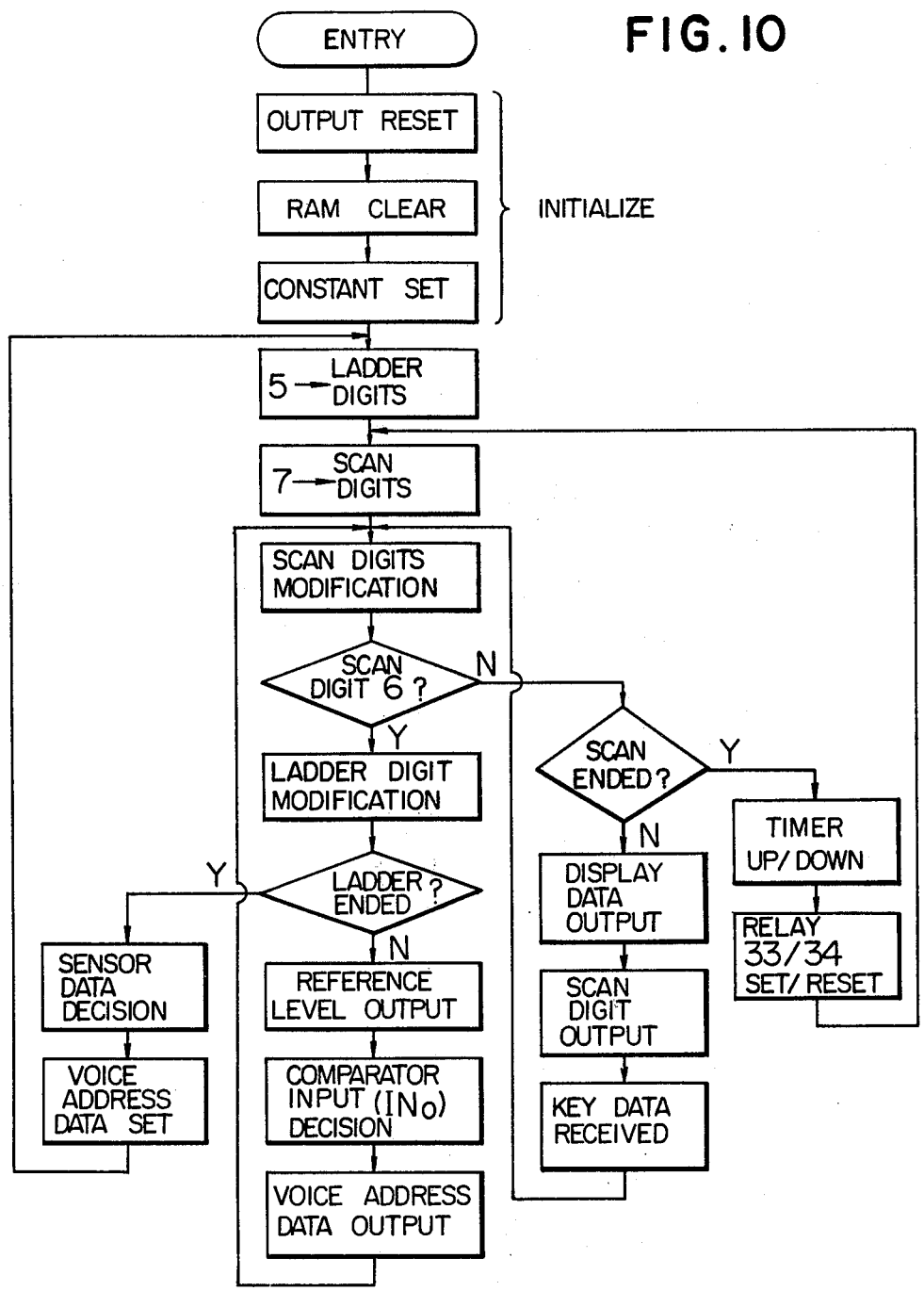
FIG. 10 is a flowchart of a control program.

The control program of the microcomputer will be briefly explained. This program is stored in the ROM of the microcomputer and is engaged in various system operations described above. A flowchart of the system operations is shown in FIG. 10, in which the starting point is ENTRY. First, all the output ports of the microcomputer are reset and the RAM is cleared. A predetermined constant is loaded in a predetermined address of the RAM. This is the initialization process of the microcomputer.

Then the FIG. 5 is preset in the ladder digit register in the RAM and the FIG. 7 in the scan digit register. These are decremented by the next scan digit modification and ladder digit modification and form basic data for time sharing of the system.

The timing controlled by the scan digit is 7 periods from 6 to 0. At the period 6, no work for display is performed but a reference level for reading the sensor data is produced. The reference level includes $Ref_4$ to $Ref_0$, which are assigned with the five periods from 4 to 0 by the value of the ladder digit modification register. A bit is set in descending order from the significant bit $Ref_4$ of the reference level every one scan, and decision is made on the output (SNS) of the comparator 40 under the respective state. By repeating the set and reset every bit in this way, all the sensor data are prepared. At the 6th scan, the ladder modification is completed and the sensor data are judged thereby to estimate the heating progress. If the heating progress is required to be announced at this time, predetermined voice address data are set in the RAM and produced sequentially from the next scan.

At the periods 5 to 0, the display tube 37 is lit dynamically. In other words, display data are produced at $Seg_7$ to $Seg_0$, followed by the lighting of a predetermined digit. At the same time, the key matrix 42 is scanned at SC4 to SC0, and the key data are collected.

Upon completion of these displays and key processing, the relays 33 and 34 for the output control section 32 and the heating time control section 31 and the next up/down of the timer means are set or reset. And the transfer is made back to the start of the scan routine again.

What is claimed is:

1. A heating apparatus comprising:

a heating chamber for housing an object to be heated;
heating means for supplying heat to said heating chamber;
input means for programming a desired operation, said input means including at least one multi-command key for accomplishing a multiplicity of functions;
a main control section having a random access memory (RAM) for storing a current operating condition, said main control section
selecting a function to be performed among said multiplicity of functions by checking said RAM to determine the current operation condition when said multi-command key is depressed, and producing a voice select signal corresponding to the selected function;
a time control section controlled by a control signal from said main control section for controlling the supply of power to said heating means;
output switching means for varying the output of said heating means in response to a control signal from said main control section;
a voice memory for storing a plurality of voice data;
a voice synthesizer section for reading out selected voice data from said voice memory and synthesizing said selected voice data into a voice; and
means for producing an address signal for a predetermined voice data in response to the voice select signal from said main control section in order to read out the voice data stored in said voice memory, said voice synthesizer section announcing said selected function to be performed together with a procedure to be operated subsequently.

2. A heating apparatus according to claim 1, wherein the multi-command key comprising said input means is a single STOP/RESET key for issuing multiple commands including a stop function to terminate the supply of power to said heating means by operating said time control section and a reset function to cancel the preset heating time and the output from said RAM, said time control section and said output switching means; said main control section processing decoding of the data from said STOP/RESET key in top priority over the other keys so that execution of a function initiated by a key entered previously is stopped thereby executing a selected one of the stop and reset functions.

3. A heating apparatus comprising:
a heating chamber for housing an object to be heated;
heating means for supplying heat to said heating chamber;
input means for programming a command for a desired operation, said input means including a program recall key;
a main control section for producing a control signal in response to a command from said input means, said main control section providing at least one of display data and a voice select key upon depression of said program recall key;
a time control section controlled by a control signal from said main control section for supplying power to said heating means;
output switching means for changing the output of said heating means;
a RAM for storing sequentially any data applied thereto successively including an output and a heating time from said input means;
display means for displaying said display data;
a voice memory for storing a plurality of voice data;
a voice synthesizer section for reading out selected voice data from said voice memory and synthesizing the same into a voice; and
means for producing an address signal for reading out the selected voice data in said voice memory, said display means and said voice synthesizer section displaying and announcing again the heating time and output respectively for each stage successively which has been stored in said RAM.

4. A heating apparatus comprising:
a heating chamber;
heating means for supplying heat to said heating chamber;
a main control section;
timer means for counting clock pulses applied to said main control section;
a timer control section for supplying power to said heating means in response to the counting of said timer means, said timer control section being controlled by said main control section;
a voice data memory;
a voice synthesizer section for reading out selected voice data from said voice data memory in accordance with a predetermined address signal provided by said main control section, said voice synthesizer section synthesizing said selected voice data into a voice;
said main control section providing said address signal to said voice data memory for announcing a residual heating time in accordance with the counting of said timer means.

5. A heating apparatus according to claim 4, which further comprises a clock generator section for supplying clock pulses to said main control section and a second timer means for counting on the basis of an oscillator actuating said main control section, said second timer means being reset when the clock pulses are counted by said main control section, said main control section determining that said clock generator section has failed when said second timer has counted for a predetermined period and controlling said timer control section to turn off said heating means, said main control section providing at the same time an address signal to said voice synthesizer section to cause one of a predetermined alarm and an error to be announced.

* * * * *